United States Patent
Ciabattoni

(10) Patent No.: US 9,355,292 B2
(45) Date of Patent: May 31, 2016

(54) OPTICAL INFORMATION ACQUISITION DEVICE

(71) Applicant: DATALOGIC IP TECH S.R.L., Lippo di Calderara di Reno (IT)

(72) Inventor: Stefano Ciabattoni, Ozzano Dell'Emilia (IT)

(73) Assignee: Datalogic IP Tech S.r.l., Bologna (IT)

( * ) Notice: Subject to any disclaimer, the term of this patent is extended or adjusted under 35 U.S.C. 154(b) by 0 days.

(21) Appl. No.: 14/741,942

(22) Filed: Jun. 17, 2015

(65) Prior Publication Data

US 2015/0371071 A1    Dec. 24, 2015

(30) Foreign Application Priority Data

Jun. 18, 2014   (IT) .............................. MI2014U0204

(51) Int. Cl.
| | |
|---|---|
| *G06K 7/10* | (2006.01) |
| *G06K 7/14* | (2006.01) |
| *G06K 9/20* | (2006.01) |
| *H01R 33/00* | (2006.01) |
| *H01R 25/00* | (2006.01) |

(52) U.S. Cl.
CPC .............. *G06K 7/10821* (2013.01); *G06K 9/20* (2013.01); *H01R 25/006* (2013.01); *H01R 33/00* (2013.01)

(58) Field of Classification Search
CPC ............ G06K 7/10; G06K 7/14; G06K 7/04; G06K 13/00; G06K 19/06; G06F 17/00
USPC .......................... 235/454, 375, 444, 476, 490
See application file for complete search history.

(56) References Cited

U.S. PATENT DOCUMENTS

2003/0029915 A1*   2/2003   Barkan et al. .................. 235/454

* cited by examiner

*Primary Examiner* — Edwyn Labaze
(74) *Attorney, Agent, or Firm* — Shook, Hardy & Bacon L.L.P.

(57) ABSTRACT

An optical information acquisition device that comprises a main body and a connector assembly associated with said main body and comprising three connectors. The connector assembly can be rotated with respect to said main body between a first operating position wherein said connectors extend substantially perpendicularly to a first side of said main body and a second operating position in which said connectors extend substantially perpendicularly to a second side of said main body. The three connectors are positioned at the vertices of an acute-angled triangle, more preferably at the vertices of an equilateral triangle.

20 Claims, 11 Drawing Sheets

OPTICAL INFORMATION ACQUISITION DEVICE

CROSS-REFERENCE TO RELATED APPLICATIONS

This application claims priority under 35 U.S.C. §365 to MI2014U000204, which was filed on Jun. 18, 2014 in Italy. The entirety of the aforementioned application is incorporated by reference herein.

TECHNICAL FIELD

The present invention relates to a device for the acquisition of optical information.

BACKGROUND

With regard to this description and the subsequent claims, the expression "acquisition of optical information" is meant to indicate the acquisition of information concerning an object (for example, distance, volume, footprint, its identifying data, or its characteristics) by means of the acquisition and elaboration of a diffuse light signal emanating from the same object. The expression: "optical information" is used in the broadest sense and includes optical codes, but also, more generally, images containing suitable characteristics for the identification and/or selection of an object, for example, on the basis of its shape and/or volume.

With the expression: "optical code", is meant to indicate any graphical representation that has the function of storing encoded information. A particular example of an optical code consists in linear or two-dimensional codes, in which information is encoded by using appropriate combinations of fixed shape elements, for example square, rectangular or hexagonal, of a dark color (usually black) separated by light elements (spaces, usually whites), such as bar codes, stacked codes and bi-dimensional codes generally, color codes, etc. The expression "optical code" also includes, more generally, other graphical forms with an information encoding function including clearly printed characters (letters, numbers, etc.) and forms ("pattern") details (such as stamps, logos, signatures, fingerprints, etc.). The expression "optical code" also includes detectable graphical representations, not only in the visible light field but also in the range of wavelengths between infrared and ultraviolet.

For ease of discussion, in the following text explicit reference will be made to optical code readers (commonly referred to as: scanners) as examples relating to the implementation of this invention. The invention does however find application in other optical information acquisition devices such as optical image sensors (vision sensors, smart cameras) for the recognition of objects by means of detecting their features regarding shape or dimensions, and generally for artificial vision applications such as object quality control in industrial processes.

The optical information acquisition device of the present invention finds a preferred application within all systems wherein an array of objects is to be sorted quickly and effectively, such as for example motorized product storage systems or in the field of transport. In such circumstances, the scanner is placed in a fixed position near a conveyor belt upon which are placed the objects to be sorted and the sorting is carried out based upon the reading of an optical code printed on a label associated with each object.

The scanner typically comprises a main body that contains all of the devices necessary for the detection and reading of the optical code, and a power connector associated with the main body for the electrical supply of the above-mentioned devices and the transfer of input/output data to/from the scanner.

In those cases where the scanner is designed to be installed within a local area network (LAN), in addition to the above-mentioned power connector (which in this case may not be used for data transfer) the scanner includes a connector for transferring data to and from the network (in particular an Ethernet connector). The Ethernet connector is associated with the main body near to the power connector. These scanners are also indicated below by the expression "scanner with a dual connector".

Scanners with dual connectors are available on the market wherein the power connector and the Ethernet connector are part of a connector assembly that can be swiveled with respect to the main body. In particular, the connector assembly can be rotated with respect to the main body between an initial operating position wherein said connectors extend substantially perpendicularly to one side face of the main body and a second operating position wherein said connectors extend substantially perpendicularly to a rear face of the main body.

The scanners described above allow the connectors to be positioned most appropriately, between said two operating positions depending upon the space available within the scanner installation area corresponding to one of the said faces and/or the orientation of the external cables to be connected to the scanner. In particular this scanner allows for the wiring of the scanner (i.e. the connection of external cables to the respective scanner connectors) at that face of the scanner that has the greatest freedom of action and/or without the necessity to excessively bend the aforesaid cables.

It is known that a plurality of scanners that are connected in series to each other can then be connected to a LAN, this in order to combine the information read from each of said scanners.

In this case, the first scanner in the series (scanner Master) is connected to a programmable logic controller (PLC) or a host PC, while the other scanners in the series (scanner Slave) are each connected to a respective shunt device having an input connector for the cable upstream of the series, an output connector for the cable downstream of the series, a first power connector for supplying power to the shunt device and a second power connector for supplying power to the respective scanner Slave. The shunt device output connector connected to the last scanner Slave of the series is connected to a termination.

The Applicant has noted that the creation of a network of scanners of the type described above, necessarily requires, other than the installation of the scanners themselves, the installation of the aforesaid shunt devices which is quite expensive.

BRIEF SUMMARY

The technical problem underlying the present invention is thus to produce a scanner that can be connected to a LAN in series with other scanners but without the need to make use of the said sorting/communication devices thus achieving clear advantages in terms of ease of installation and layout.

The Applicant has found that by producing a scanner with a connector assembly made up of three connectors, two of which are conFigured in such a way as to be connected to a Profinet network, it is thereby possible to avoid making use of said shunt devices. In the following text such a scanner is indicated by the expression "triple connector scanner".

To achieve the same benefits that are achievable with a scanner with a dual connector during the wiring phase, the scanner connector assembly of the invention can, with respect to the main body of the scanner, be rotated between a first operating position wherein the connectors extend substantially perpendicularly at right angles to a first side of the main body and a second operating position in which the connectors extend substantially perpendicularly to a second side of the main body.

The Applicant considered it appropriate to limit as much as possible the footprint of said connector assembly (such that installation of the scanner can take place even in environments where the installation area is reduced or poorly accessible), while at the same time ensuring that between the various connectors there is a minimum sufficient distance to enable easy and effective wiring of the scanner. In this respect, the Applicant has found that it is advantageous to have the three connectors positioned at the vertices of an acute-angled triangle.

Ultimately, the present invention relates to a device for the acquisition of optical information having the features recited in claim 1.

In particular, the device of the invention comprises:
a main body
a connector assembly associated with said main body comprising three connectors;
wherein said connector assembly can be rotated with respect to said main body between a first operating position wherein said connectors extend substantially perpendicularly to a first side of said main body and a second operating position in which said connectors extend substantially perpendicularly to a second side of said main body;
wherein said three connectors are positioned at the vertices of an acute-angled triangle.

In the following text "acute-angled triangle" is meant to indicate a triangle wherein the three angles, as defined by the three sides, are all acute.

The scanner of the present invention can therefore be used with the connectors arranged in one of said two operating positions or any other intermediate operating position between these two operating positions depending upon the orientation of the external cables to be connected to the scanner and/or of the space available within the area of the scanner installation.

The Applicant has noted that any acute-angled triangle configuration (therefore either an acute-angled scalene triangle configuration, an isosceles triangle configuration or an equilateral triangle configuration) leads to the aforementioned advantages in terms of footprint containment and ease of wiring.

The Applicant has found however that a particularly preferred solution is one in which the three connectors are arranged at the vertices of an equilateral triangle. This configuration, once said minimum distance between the various connectors has been defined, leads to a footprint that is smaller than that obtained with the other aforesaid mentioned solutions.

In an equilateral triangle configuration the reciprocal distance between any connector and the other two is the same.

The three connectors are preferably arranged at a reciprocal distance from each other of between about 19 mm and about 22 mm, most preferably equal to about 20 mm or about 21 mm. The Applicant has noted that the aforesaid distance values are the minimum necessary in order to allow for a smooth and effective wiring that best minimizes the footprint of the connector assembly.

Preferably, a first of said three connectors is defined by a power connector, a second of said three connectors is defined by a first input/output data connector and a third of said three connectors is defined by a second input/output data connector.

The input/output data connectors are in particular Ethernet connectors.

Preferably, when the connector assembly is in said first operating position said first input/output data connector and said second input/output data connector extend along a respective direction such that they intersect with the main body.

Most preferably, when the connector assembly is in said second operating position said first input/output data connector and said second input/output data connector extend along a respective direction such that they intersect with the main body.

Advantageously, in each of the aforesaid operating positions the two input/output data connectors therefore only protrude from one respective face of the main body thus allowing for the positioning of the scanner within environments wherein at the other face of the main body (the face from where the connectors would protrude if the connector assembly were in the other of the aforesaid operating positions) the available space is reduced. In particular, both when the aforesaid connectors are positioned perpendicularly to one side face of the main body (corresponding to one of the aforesaid first and second operating positions), both when the above mentioned connectors are positioned perpendicularly to the rear face of the main body (corresponding to the other of the aforesaid first and second operating positions), and when the aforesaid connectors are positioned in any of the possible intermediate operating positions between the first and second operational positions the connector assembly has a height not exceeding that of the main body.

In the preferred embodiments of the present invention the main body comprises a hole for coupling to the connector assembly that extends coaxially along an axis of rotation of the connector assembly and two connectors of said three connectors are symmetrically arranged between opposing parts with respect to said axis of rotation. This arrangement allows for the use of two absolutely identical connectors and cables within the main body of the scanner of the same length, with clear advantages in terms of production economy.

Preferably, said two connectors are the aforesaid first input/output data connector and second input/output data connector.

In particularly preferred embodiments of the present invention, the connector assembly includes a spigot which is inserted into said hole and locked into place along said axis of rotation.

Preferably, said locking in position is obtained by placing a retaining ring within a groove formed on said spigot and bringing said retaining ring into contact with a wall of said main body. The desired coupling of the connector assembly to the main body is made in an extremely simple way using low-cost structural components that are readily available on the market.

Preferably, said spigot comprises, at one of its face of the free end within said main body, a pair of abutting surfaces and said main body comprises, at said hole, at least one abutting element intended to cooperate with a respective abutting surface of said pair of abutting surfaces when said connector assembly is in one of said first and second operating positions and with the other abutting surface of said pair of abutting surfaces when said connector assembly is in the other of said first and second operating positions.

Most preferably, said spigot includes, in proximity to each abutting surface of said pair of abutting surfaces, a corresponding retaining element of said connector assembly in said first operating position or in said second operating position.

Even more preferably, said retaining element is defined by a superficial protrusion that is conFigured in such a way as to cooperate with said abutting element when the connector assembly is in said first operating position or in said second operating position, locating itself on the opposite side to the respective abutting surface with respect to said abutting element.

In preferred embodiments of the present invention, the connector assembly includes a support element for the said three connectors that is integrally associated with a coupling element to the main body and said spigot is constructed as one piece together with said coupling element.

The device of the present invention is preferably an optical code scanner.

BRIEF DESCRIPTION OF THE DRAWINGS

More features and benefits of the device of the present invention will become more evident from the following detailed description of one preferred embodiment thereof, by way of an illustrative and non limiting example with reference to the attached drawings. In said drawings.

DETAILED DESCRIPTION

Figure 1:
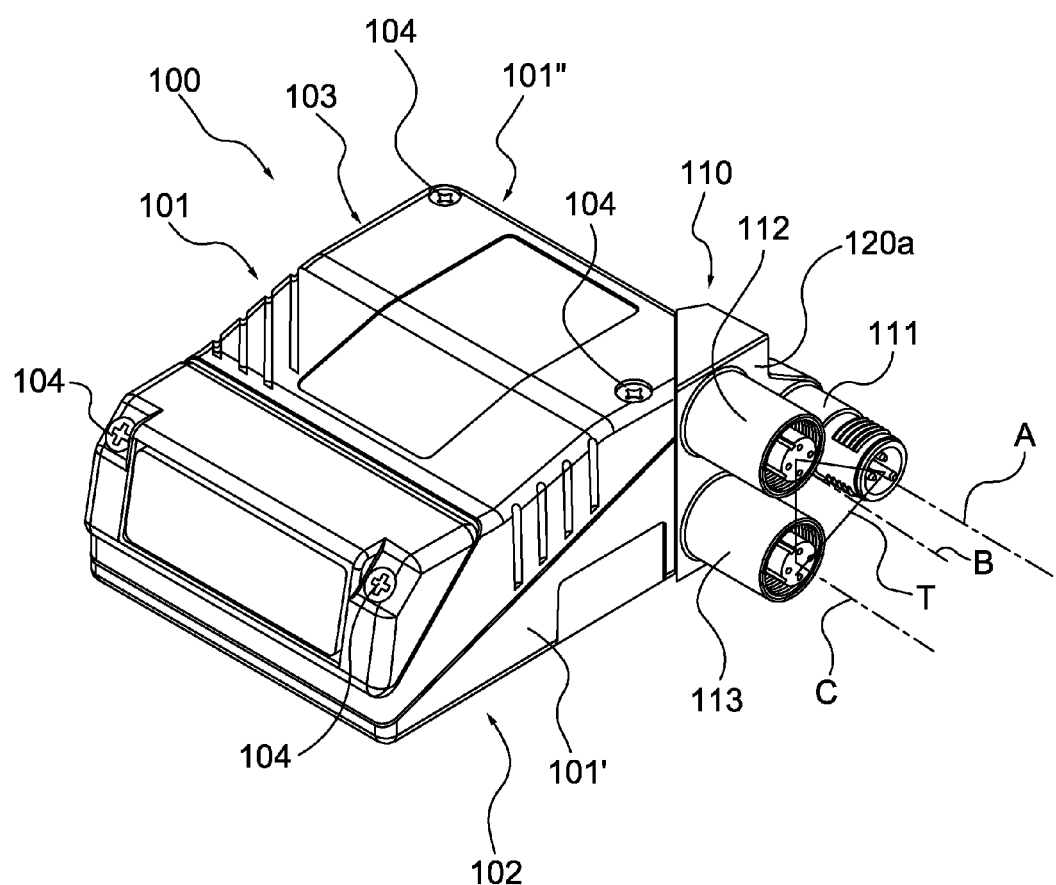
FIG. 1 is a schematic perspective view of an optical information acquisition device according to the present invention, with the connector assembly positioned in a first operating position thereof.
Figure 2:
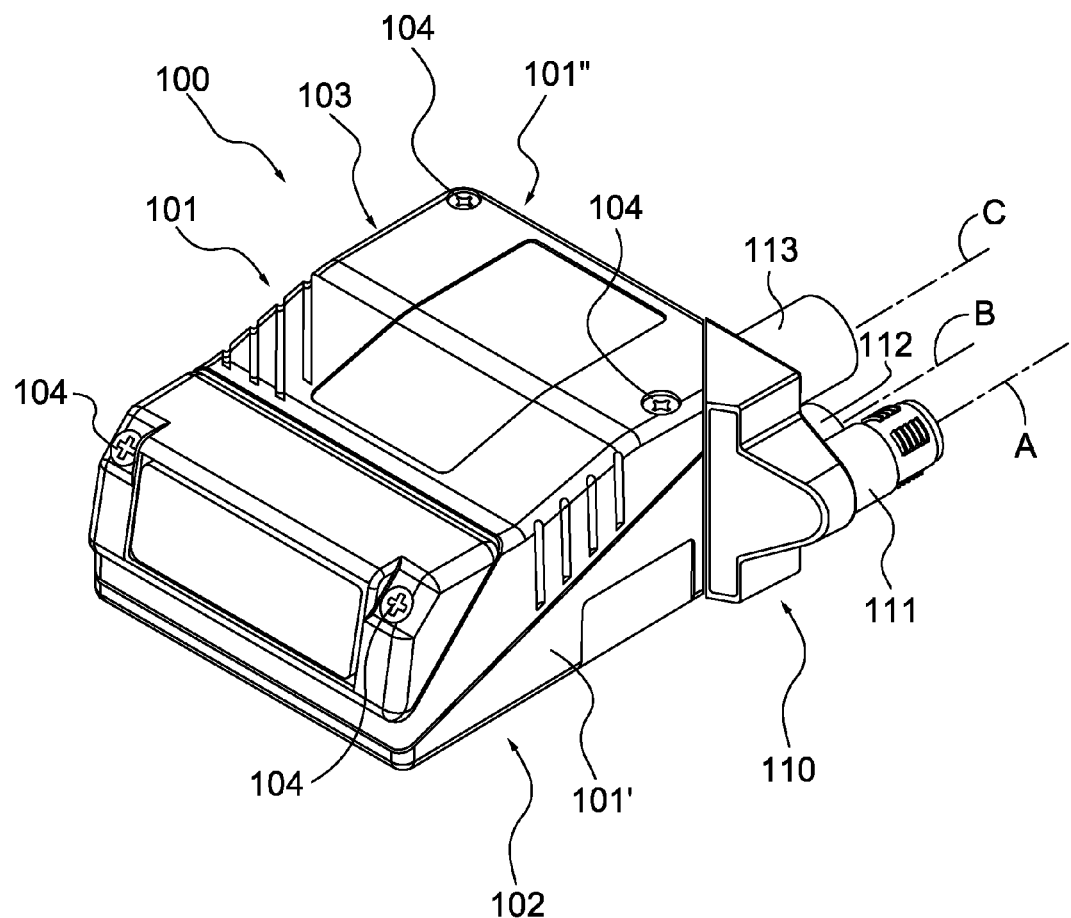
FIG. 2 is a schematic perspective view of an optical information acquisition device according to the present invention, with the connector assembly positioned in a second operating position thereof.

In FIGS. 1 and 2, with the numeric reference 100 there is an optical information acquisition device according to the present invention.

The device 100 is a scanner, in particular a laser scanner, used for example in storage systems and systems for the transportation of various types of objects (e.g. parcels, bags, envelopes etc.) for the acquisition of identification data of the objects and the intelligent sorting of the same objects.

With these systems, the objects are placed on a conveyor belt which moves with respect to the scanner 100 (which is typically mounted in a fixed position) and said objects are sorted based upon the reading of an optical code printed on a label associated with each object. Said label reading is carried out by the aforesaid scanner.

Figure 8:
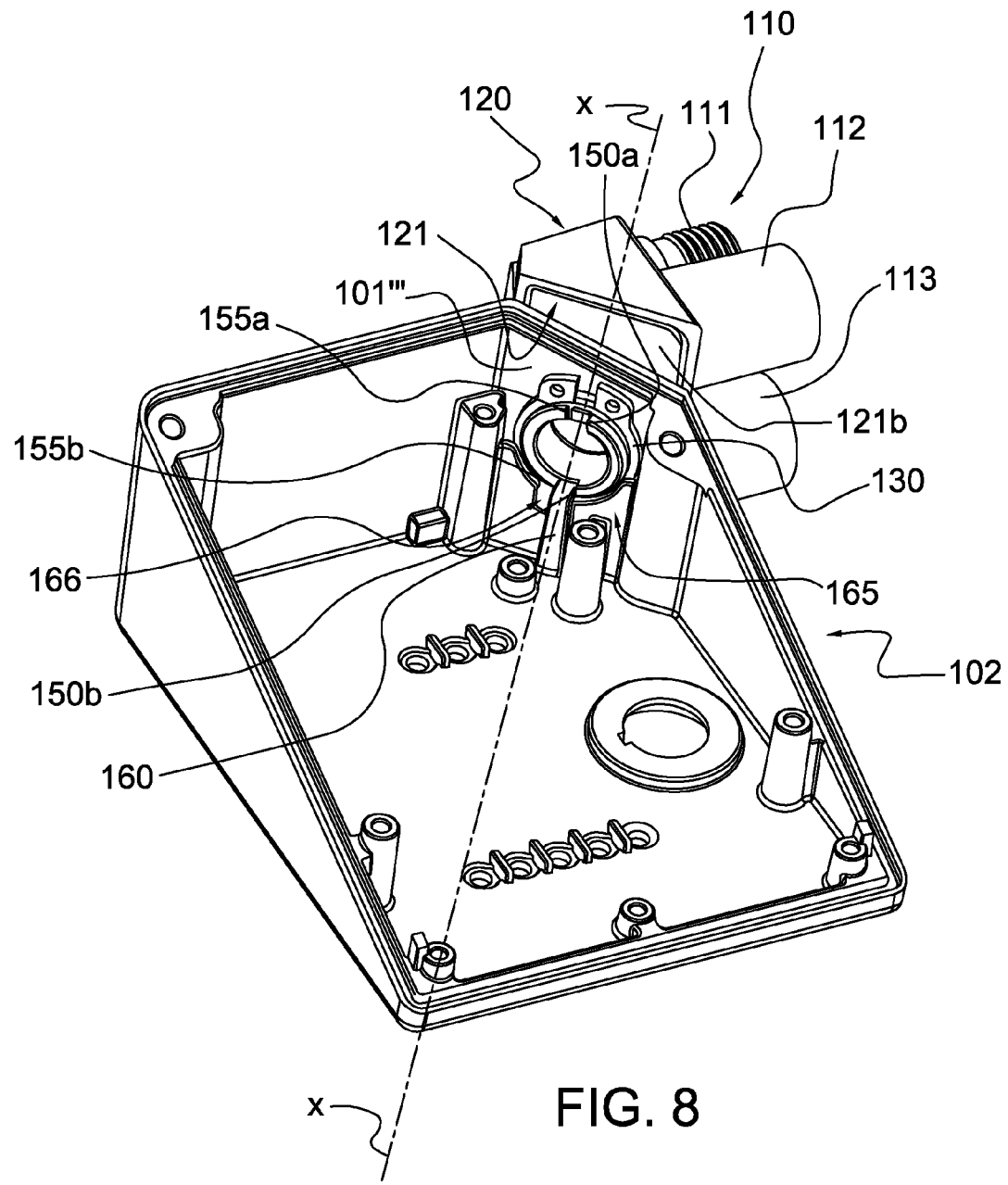
FIG. 8 is a schematic perspective view of the part of the device illustrated in FIG. 7 coupled to the connector assembly illustrated in FIG. 4, with the connector assembly positioned in the operating position of FIG. 1.
Figure 9:
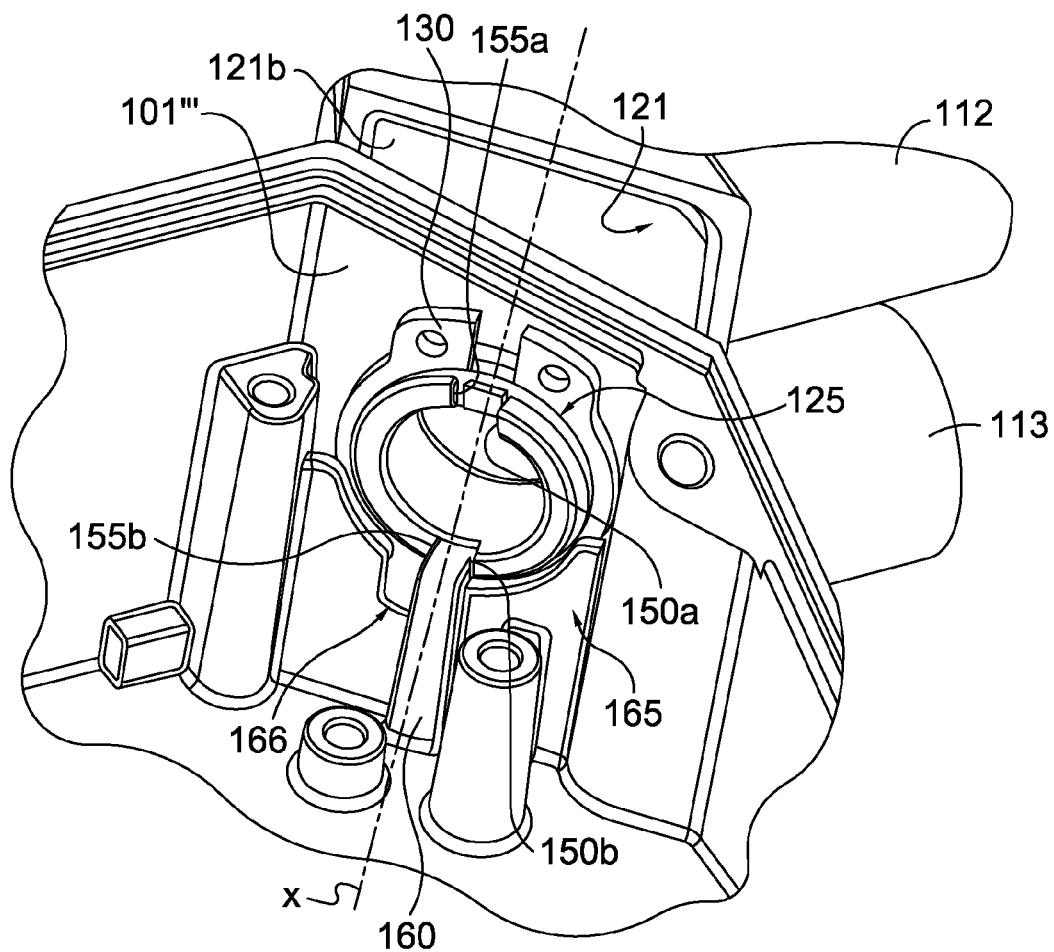
FIG. 9 is a magnified view of part of that illustrated in FIG. 8.

The scanner 100 comprises a main body 101 containing all the parts needed in order to read the optical codes associated with the various objects. Said parts are housed within an envelope defined by a lower casing 102 and upper casing 103 which are reciprocally fastened together by means of screws 104. The lower casing 102 is illustrated in FIGS. 8 and 9.

The scanner 100 can either be a mono laser reader (or fixed or auto focus), comprising a single laser light source, or a multi laser (or multi-focus) reader, i.e. comprising more than one laser light source.

Some examples of mono laser readers are described in U.S. Pat. No. 6,049,406, whereas some examples of multi laser readers are described and illustrated in U.S. Pat. No. RE36251.

The scanner 100 is preferably a mono laser reader.

According to an alternative embodiment, the scanner 100 is a type of imager.

Given that it is of a conventional type, the main body of the scanner 100 will not be described here below, unless explicitly described otherwise.

The main body 101 is associated with a connector assembly 110 comprising of three connectors, respectively indicated by 111, 112 and 113.

The connector 111 is a power connector, in the specific example illustrated here it is a circular male connector, e.g. an M12 X 1 type connector.

The connectors 112 and 113 are instead data transfer connectors (input and output). In particular, the connectors 112 and 113 are circular Ethernet connectors that allow for the transfer of data to and from a local Profinet network. In the specific example illustrated here, the connectors 112 and 113 are absolutely identical to each other, for example both of the M12 X 1 female type.

Figure 3:
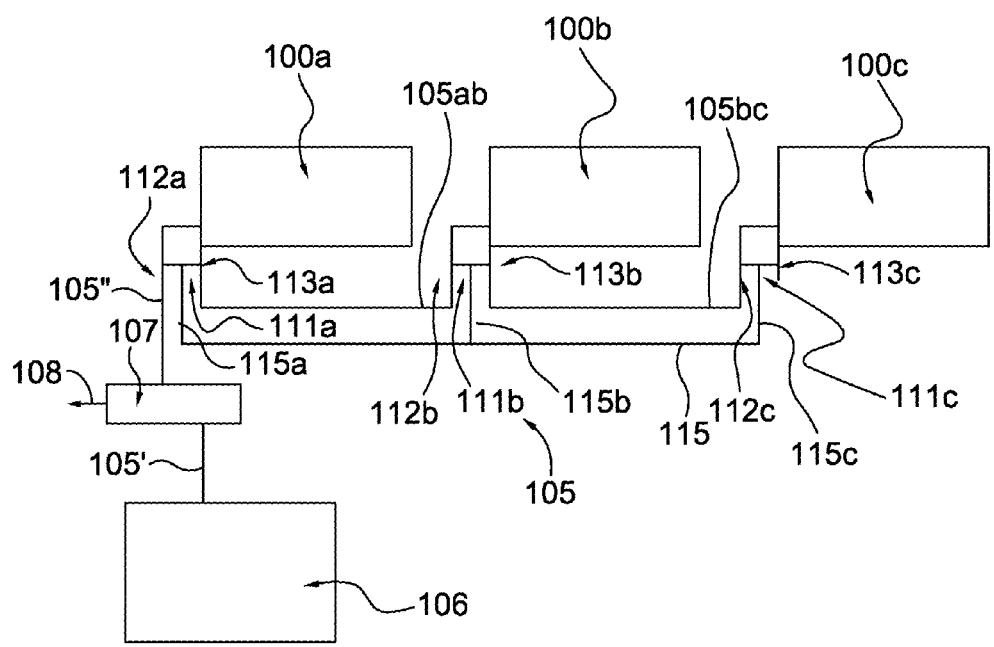
FIG. 3 is a schematic view of an exemplary application of an optical information acquisition device of the present invention.

A schematic example of the use of the scanner 100 is illustrated in FIG. 3.

In this example three scanners (indicated respectively by 100a, 100b and 100c) are connected in series in a Profinet network 105. The connectors 111, 112 and 113 of the scanners 100a, 100b, 100c are respectively indicated by the numeric references 111, 112 and 113 followed by the letters a, b or c in order to identify belonging to either scanner 100a, 100b or 100c.

The network 105 comprises a programmable logic controller (PLC) 106 that acts as the MASTER and a switch 107 that is connected to the PLC 106 by means of a first spur 105' of the network 105.

The switch 107 can be connected to a control device (not illustrated) by means of an Ethernet network spur 108 in order to allow for the configuration of the scanners 110a, 110b, 100c.

A connector 112a, 113a (the connector 112a in the specific example illustrated here) of the scanner 100a is connected to the switch 107 by means of a second spur 105'' of the network 105.

The other connector 112a, 113a (the connector 113a in the specific example illustrated here) of the scanner 100a is connected to a connector 112b, 113b (the connector 113b in the specific example illustrated here) of the scanner 100*b* by means of a spur 105*ab* of the network 105.

The other connector 112*b*, 113*b* (the connector 113*b* in the specific example illustrated here) of the scanner 100*b* is connected to a connector 112*c*, 113*c* (the connector 112*c* in the specific example illustrated here) of the scanner 100*c* by means of a spur 105*bc* of the network 105.

The power connectors 111*a*, 111*b* and 111*c* are connected to a supply network 115 by means of the respective spurs 115*a*, 115*b*, 115*c*.

The scanners 100*a*, 100*b*, 100*c* behave as Slaves of the PLC 106.

With reference to FIGS. 1 and 2, the connectors, 111, 112 and 113 extend coaxially in the respective directions A, B and C essentially parallel to each other.

The connector assembly 110 can be rotated with respect to the main body 101 between a first operating position (illustrated in FIG. 1) and a second operating position (illustrated in FIG. 2). Said rotation takes place around a rotation axis X-X illustrated in FIGS. 8-11 and further described below.

In the first operating configuration (FIG. 1), the directions A, B and C are substantially perpendicular to one side of the main body 101 (the side face 101' of the scanner 100 illustrated in FIGS. 1 and 2), while in the second operating configuration (FIG. 2), the directions A, B and C are substantially perpendicular to a different side of main body 101 (the rear face 101" of the scanner 100 illustrated in FIGS. 1 and 2).

In both of the aforesaid operating positions, the directions B and C preferably intersect the main body 101, while direction A does not intersect it. The overall footprint of the connector assembly 110 is such that it has a height that is preferably not greater than that of the main body 101.

With particular reference to FIG. 1, the connectors 111, 112 and 113 are arranged at the vertices of an acute-angled triangle, in particular an equilateral triangle. This triangle is depicted in FIG. 1 using a continuous line at the free ends of the connectors 111, 112 and 113 and is indicated by the letter T.

Preferably, the connectors 111, 112 and 113 are positioned at a reciprocal distance from each other of between about 19 mm and about 22 mm, particularly equal to about 20 mm or about 21 mm.

Figure 4:
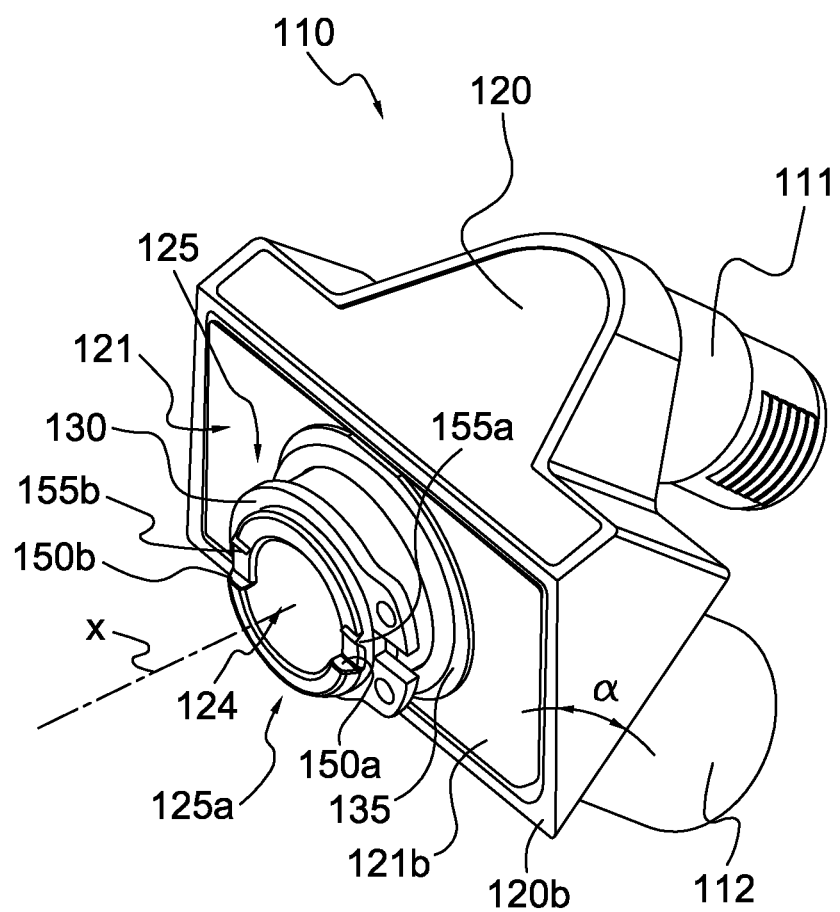
FIG. 4 is a schematic perspective view of the device connector assembly of FIGS. 1 and 2.
Figure 5:
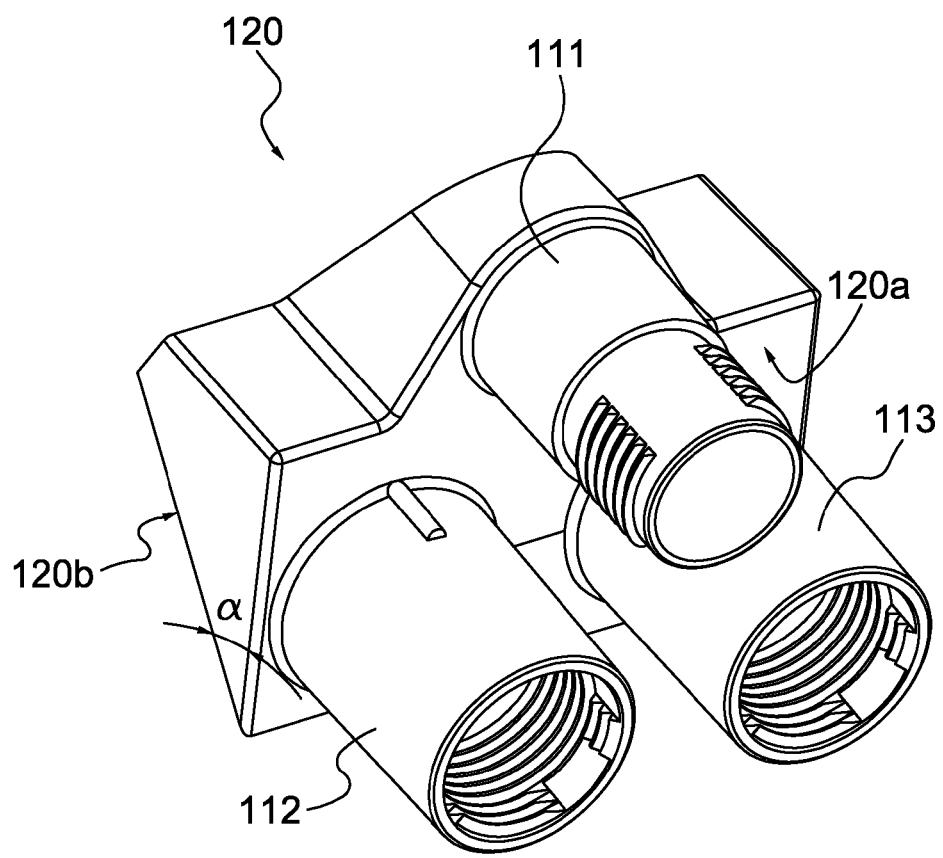
FIG. 5 is a schematic perspective view of a connector assembly element of FIG. 4.

With reference to FIGS. 4 and 5, the connector assembly 110 comprises a support element 120 for the connectors 111, 112 and 113. That support element 120 presents a flat face 120*a* from which the connectors 111, 112 and 113 protrude and a recessed face 120*b* that faces the main body 101.

A through-opening surrounded by an undercut border is formed upon the face 120*b*. In the example illustrated here the through-opening has substantially rectangular shape.

The face 120*b* is inclined with respect to the face 120*a* at an angle α equal to 45°.

Figure 6:
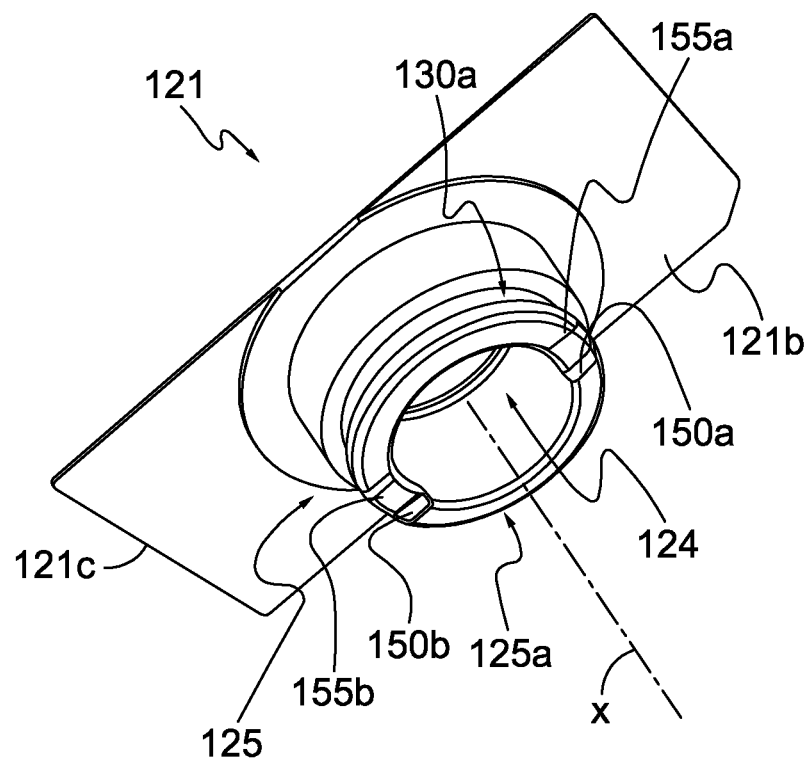
FIG. 6 is a schematic perspective view of a connector assembly element of FIG. 4.

With reference to FIGS. 4 and 6, the connector assembly 110 further comprises a coupling element 121 which is integrally coupled by interference to the face 120*b* of the support element 120 at the through-opening formed upon it, essentially closing said through-opening.

The stable coupling between the support element 120 and the coupling element 121 is preferably achieved by the bonding of the undercut border formed upon the face 120*b* of the support element 120 with the external side edge 121*c* (FIG. 6) of the coupling element 121. A thermosetting resin is used for this purpose, which in addition to serving as a gluing element also serves as a sealing element.

In an essentially central position, the coupling element 121 presents a through hole 124 having an axis of symmetry x.

The axis of symmetry x intersects the face 121*b* facing the main body 101 at a point belonging to a plane of symmetry of the connector assembly 110. The connectors 112 and 113 are consequently arranged symmetrically from opposing parts with respect to a plane that includes said axis of symmetry x and that bisects the connector 111 into symmetrical parts.

Figure 7:
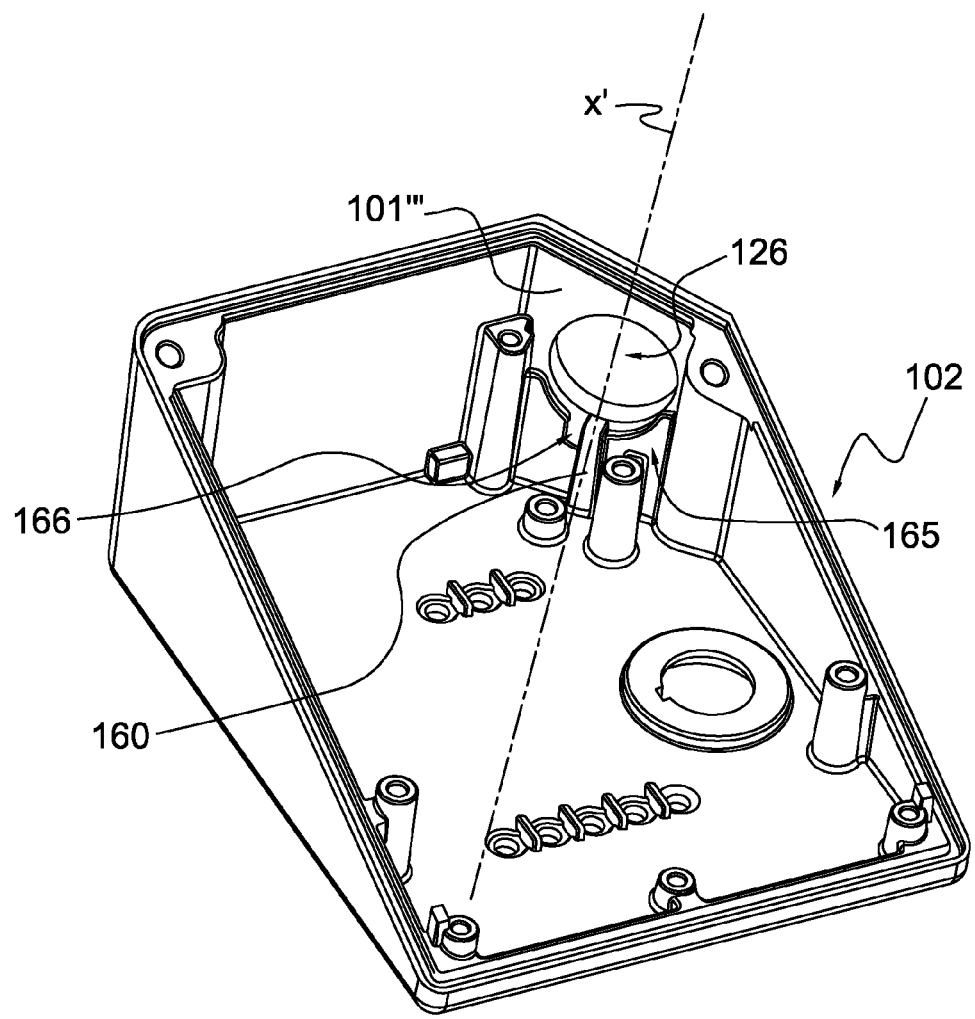
FIG. 7 is a schematic perspective view of a portion of the device of FIGS. 1 and 2, such a part being intended to be coupled to the connector assembly of FIG. 4.

Upon the face and coaxially with respect to the hole 121*b*, the coupling element 121 comprises a spigot 125 that protrudes inside the main body 101 (FIGS. 8-11) passing through a hole 126 formed on a wall 101''' of the lower casing 102 of the main body 101 (FIG. 7). The hole 126 has an axis of symmetry x' that is coincident with the axis of symmetry x of the through hole 124.

The axis of symmetry x and the axis of symmetry x' define a coupling axis X-X between the connector assembly 110 and the main body 101. This coupling axis X-X is traced out in FIGS. 8-11 and also defines an axis of rotation for the connector assembly 110 with respect to the main body 101 in passing from the first operating position (FIG. 1) to the second operating position (FIG. 2) and vice versa.

The spigot 125 is integrally formed together with the coupling element 121 and is associated with the lower casing 102 of the main body 101 such as to rotate around said axis of rotation XX during rotation of the connector assembly 110 with respect to the main body 101.

The position of the spigot 125 along the axis of rotation X-X is stable, such that any possible movement of the connector assembly 110 with respect to the main body 101 along the axis of rotation X-X is thereby prevented, except minimal movements due to dimensional tolerances and possible crushing of an O-ring 135 (FIG. 4) interposed between the face 121*b* of the coupling element 121 and the outer face of the wall 101''' of the lower casing 102 of the main body 101.

The locking in position of the connector assembly 110 with respect to the main body 101 along the axis of rotation X-X is obtained by housing a blocking element 130 (FIG. 4) within a groove 130*a* (FIG. 6) formed upon the spigot 125 in proximity to one of its face of the free end 125*a* (FIG. 4) disposed within the main body 101 (FIGS. 8-11). The position of the groove 130*a* is such that the blocking element 130 is flush against the inner face of the wall 101" of the lower casing 102 of the main body 101. In the example illustrated here, the blocking element 130 is a Seeger ring.

The connectors 111, 112 and 113 are connected to respective cables associated with electronic cards housed internally to the main body 101. These cables pass internally to the spigot 125 by means of the through hole 124 (and therefore through the hole 126 formed within the lower casing of the main body 101) such that they reach the respective connectors 111, 112, 113.

As illustrated in FIGS. 4 and 6, a pair of abutting surfaces 150*a*, 150*b* is formed on the face of the free end 125*a* of the spigot 125. These abutting surfaces 150*a*, 150*b* are defined such that they correspond to a step formed on the face of the free end 125*a* of the spigot 125.

The abutting surfaces 150*a*, 150*b* selectively abuts against a abutting element 160 associated with the lower casing 102 of the main body 101 in proximity to the wall 101''' when the connector assembly 101 is moved between the aforesaid first operating position and the second operating position.

The abutting surfaces 150*a*, 150*b* belong to a plane parallel to a diametral plane passing through the axis of symmetry x and translated from that diametral plane at half the width of the abutting element 160.

In an embodiment of the device 100, the abutting element has a width of about 2.5 mm, such that the plane to which the abutting surfaces 150*a* and 150*b* belong is translated from the aforementioned diametral plane of about 1.25 mm.

As illustrated in FIGS. 7-11, the abutting element 160 is located at the hole 126. In the example illustrated here, the abutting element 160 is defined by a vertical rib which is aligned with a diametral plane of the hole 126. Such abutting element 160 is constructed in one piece together with the reinforcing wall 165 which is formed in one piece together with the lower casing 102 of the main body 101.

The reinforcing wall 165 presents, at one of its sides with respect to the abutting element 160, a recess 166 which is useful during the assembly phase in assisting the blocking element 130 to press against the wall 101''' of the lower casing 102 of the main body 101.

As illustrated in FIGS. 8 and 9, when the connector assembly 101 is in the operating position illustrated in FIG. 1, the abutting surface 150*b* abuts against a lateral surface of the abutting element 160.

Figure 10:
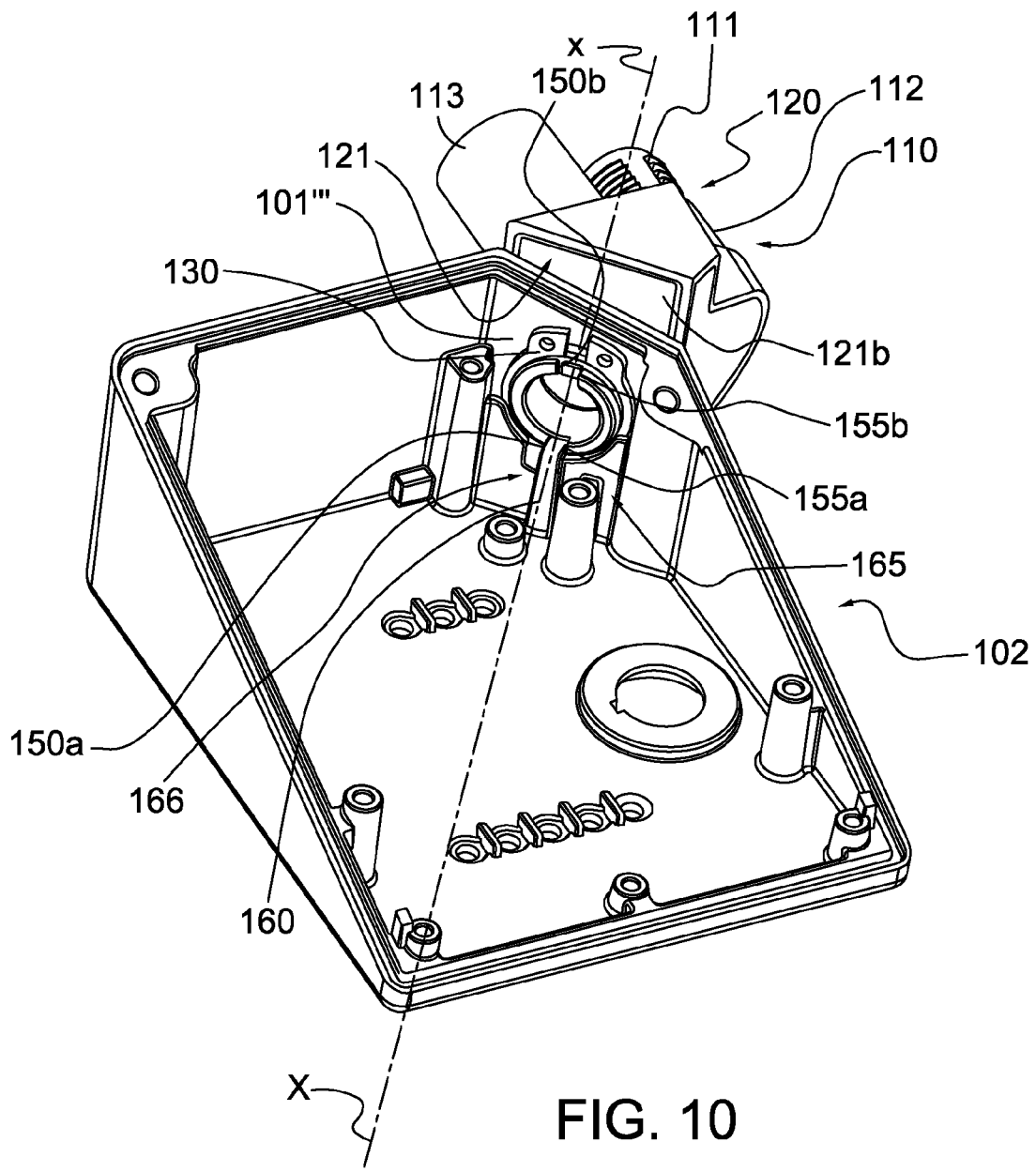
FIG. 10 is a schematic perspective view of the part of the device illustrated in FIG. 7 coupled to the connector assembly illustrated in FIG. 4, with the connector assembly positioned in the operating position of FIG. 2.
Figure 11:
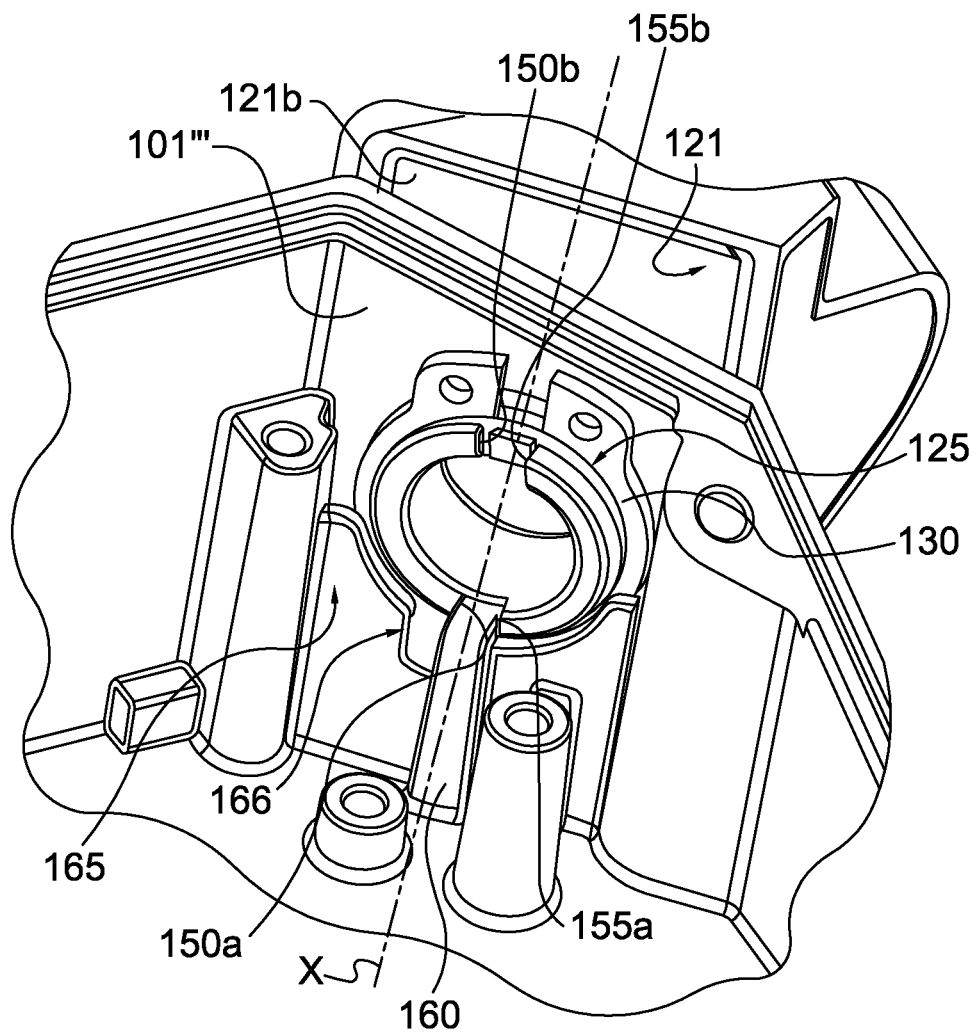
FIG. 11 is a magnified view of part of that illustrated in FIG. 10.

As illustrated in FIGS. 10 and 11, when the connector assembly 110 is rotated around the axis of rotation X-X in order to be brought in to the operating position illustrated in FIG. 2 (counterclockwise rotation in the example illustrated here), the spigot 125 rotates thus bringing the abutting surface 150*a* flush against a lateral surface of the abutting element 160 located on the opposite side to where the abutting surface 150*b* was previously flush.

The retention of the connector assembly 110 in the aforesaid operating positions and any eventual additional intermediate positions with respect to the aforesaid operating positions is obtained as a result of the friction provided by the presence of the O-ring 135. However, to increase the retention effect against the face of the free end 125*a* of the spigot 125 there is the provision, in proximity to each abutting surface 150*a* and 150*b*, of a respective retention element 155*a* and 155*b*.

Each retention element 155*a*, 155*b* is defined by a superficial protrusion which is intended to scrape, with a certain degree of interference, against the abutting surface 160 when, due to the effect of rotation of the connector assembly 110, the abutting surfaces 150*a*, 150*b* are in proximity to the abutting element 160.

Upon reaching the operating position of FIG. 1, the retention element 155*b* is then located on the opposite side to the abutting surface 150*b* with respect to the abutting element 160, remaining in contact with said abutting element 160 (FIGS. 8 and 9). Similarly, upon reaching the operating position of FIG. 2, the retention element 155*a* is then located on the opposite side to the abutting surface 150*a* with respect to the abutting element 160, remaining in contact with said abutting element 160 (FIGS. 10 and 11).

Naturally, a person skilled in the art could make additional changes and variations to the invention described above in order to satisfy specific and contingent application requirements, variations and modifications that nonetheless fall within the scope of protection as defined by the subsequent claims.

What is claimed is:

1. An optical information acquisition device, comprising:
   a main body; and
   a connector assembly associated with said main body and comprising three connectors;
   wherein said connector assembly can be rotated with respect to said main body between a first operating position, wherein said three connectors extend substantially perpendicularly to a first side of said main body, and a second operating position in which said three connectors extend substantially perpendicularly to a second side of said main body, wherein said three connectors are positioned at the vertices of an acute-angled triangle, and wherein said first side and said second side are perpendicular to each other.

2. The acquisition device according to claim 1, wherein said acute-angled triangle is an equilateral triangle.

3. The acquisition device according to claim 2, wherein said three connectors are positioned at a reciprocal distance from each other between about 19 millimeters and about 22 millimeters.

4. The acquisition device according to claim 3, wherein a first connector of said three connectors is defined by a power connector, a second connector of said three connectors is defined by a first input/output data connector, and a third connector of said three connectors is defined by a second input/output data connector.

5. The acquisition device according to claim 4, wherein when said connector assembly is in said first operating position, said first input/output data connector and said second input/output data connector extend along respective directions that intersect said main body.

6. The acquisition device according to claim 5, wherein when said connector assembly is in said second operating position, said first input/output data connector and said second input/output data connector extend along respective directions that intersect said main body.

7. The acquisition device according to claim 6, wherein said main body comprises a hole for coupling to said connector assembly that extends coaxially along an axis of rotation of said connector assembly, wherein said first input/output data connector and said second input/output data connector of said three connectors are symmetrically arranged between opposing parts with respect to said axis of rotation.

8. The acquisition device according to claim 7, wherein said connector assembly comprises a spigot that is inserted into said hole and locked into place along said axis of rotation.

9. The acquisition device according to claim 8, further comprising a retaining ring arranged into a groove formed within said spigot and in contact with a wall of said main body.

10. The acquisition device according to claim 9, wherein said connector assembly comprises a support element of said three connectors that is integrally associated with a coupling element of the main body, wherein said spigot is constructed as one piece together with said coupling element.

11. The acquisition device according to claim 7, wherein said spigot comprises, at a free end face arranged internally to said main body, a pair of abutting surfaces, and said main body comprises, at said hole, at least one abutting element intended to cooperate with a abutting surface of said pair of abutting surfaces when said connector assembly is in one of said first and second operating positions, and with the other abutting surface of said pair of abutting surfaces when said connector assembly is in the other of said first and second operating positions.

12. The acquisition device according to claim 11, wherein said spigot comprises, in proximity to each abutting surface of said pair of abutting surfaces, a corresponding retaining element of said connector assembly in said first operating position or in said second operating position.

13. The acquisition device according to claim 12, in which said retention element is defined by a superficial protrusion that is configured in such a way as to cooperate with said abutting element when said connector assembly is in said first operating position or in said second operating position, locating itself on the opposite side to the respective abutting surface with respect to said abutting element.

14. The acquisition device according to claim 13, wherein said connector assembly comprises a support element of said three connectors that is integrally associated with a coupling element of the main body, wherein said spigot is constructed as one piece together with said coupling element.

15. The acquisition device according to claim 14, wherein said device is an optical code scanner.

16. The acquisition device according to claim 11, wherein said connector assembly comprises a support element of said three connectors that is integrally associated with a coupling element of the main body, wherein said spigot is constructed as one piece together with said coupling element.

17. The acquisition device according to claim 4, wherein when said connector assembly is in said second operating position, said first input/output data connector and said second input/output data connector extend along respective directions that intersect said main body.

18. The acquisition device according to claim 2, wherein a first connector of said three connectors is defined by a power connector, a second connector of said three connectors is defined by a first input/output data connector, and a third connector of said three connectors is defined by a second input/output data connector.

19. The acquisition device according to claim 1, wherein a first connector of said three connectors is defined by a power connector, a second connector of said three connectors is defined by a first input/output data connector, and a third connector of said three connectors is defined by a second input/output data connector.

20. The acquisition device according to claim 1, wherein said device is an optical code scanner.

\* \* \* \* \*